US012019699B2

(12) United States Patent
Bar Hakim et al.

(10) Patent No.: US 12,019,699 B2
(45) Date of Patent: Jun. 25, 2024

(54) VISUAL RECORDER FOR DEMONSTRATIONS OF WEB-BASED SOFTWARE APPLICATIONS

(71) Applicant: Demostack, Inc., San Francisco, CA (US)

(72) Inventors: Aaron Bar Hakim, Rishon Lezion (IL); Gilad Avidan, Tel Aviv (IL); Ivan Dimitrov, Belgrade (RS); Avraham Levi, Tel Aviv (IL); Gonen Tiberg, Tel Aviv (IL); Yehonatan Ernest Friedman, San Francisco, CA (US)

(73) Assignee: Demostack, Inc., San Francisco, CA (US)

( * ) Notice: Subject to any disclaimer, the term of this patent is extended or adjusted under 35 U.S.C. 154(b) by 0 days.

(21) Appl. No.: 17/949,263

(22) Filed: Sep. 21, 2022

(65) Prior Publication Data
US 2023/0116021 A1   Apr. 13, 2023

Related U.S. Application Data

(60) Provisional application No. 63/253,135, filed on Oct. 7, 2021.

(51) Int. Cl.
G06F 3/0483 (2013.01)
G06F 3/0484 (2022.01)
(Continued)

(52) U.S. Cl.
CPC .......... *G06F 16/986* (2019.01); *G06F 3/0483* (2013.01); *G06F 3/0484* (2013.01); *G06F 16/957* (2019.01); *G06F 40/143* (2020.01)

(58) Field of Classification Search
None
See application file for complete search history.

(56) References Cited

U.S. PATENT DOCUMENTS 5,548,724 A    8/1996  Akizawa et al.
6,587,844 B1 * 7/2003  Mohri ............... G10L 15/14
                                          704/256.8
(Continued)

FOREIGN PATENT DOCUMENTS

CN    103595824 A    10/2013
CN    103685138 A     3/2014
(Continued)

OTHER PUBLICATIONS

Betapage, "Sitemod.io—Modify any website in real-time, Save your mod and Share it with the world", pp. 1-3, year 2022 https://betapage.co/product/sitemod-io.
(Continued)

*Primary Examiner* — Ariel Mercado
(74) *Attorney, Agent, or Firm* — Kligler and Associates Patent Attorneys Ltd

(57) ABSTRACT

Methods, storage systems and computer program products implement embodiments of the present invention that include running by a web browser, a web-based application including a set of web pages, and identifying changes in the web pages rendered by the web browser while running the web-based application. For each identified change, a corresponding state of the web-based application is recorded, wherein the corresponding state includes browser-executable code for a given web page being rendered, and one or more transitions from the corresponding state to one or more other states is also recorded. The recorded states and the recorded transitions are compiled into a state machine model of the web-based application, and a demonstration of the application is generated using the state machine model.

22 Claims, 9 Drawing Sheets

(51) Int. Cl.
  *G06F 16/957* (2019.01)
  *G06F 16/958* (2019.01)
  *G06F 40/143* (2020.01)

(56) References Cited

U.S. PATENT DOCUMENTS

| | | | |
|---|---|---|---|
| 6,608,634 | B1 | 8/2003 | Sherrard et al. |
| 7,139,978 | B2 | 11/2006 | Rojewski et al. |
| 8,108,490 | B2 | 1/2012 | Guo |
| 8,332,637 | B2 | 12/2012 | Relyea |
| 8,433,733 | B2 | 4/2013 | Sayed et al. |
| 8,543,675 | B1 | 9/2013 | Yiu et al. |
| 9,237,204 | B1 | 1/2016 | Martini et al. |
| 10,659,566 | B1 | 5/2020 | Luah et al. |
| 10,754,713 | B1* | 8/2020 | Witthawaskul ....... G06F 9/4881 |
| 10,788,957 | B1* | 9/2020 | Lenzner ................ G06F 40/143 |
| 11,570,238 | B2* | 1/2023 | Mohan ................ H04L 67/1008 |
| 2004/0054715 | A1 | 3/2004 | Cesario |
| 2004/0100507 | A1 | 5/2004 | Hayner et al. |
| 2004/0221033 | A1 | 11/2004 | Davis et al. |
| 2009/0089404 | A1 | 4/2009 | Guo |
| 2010/0318507 | A1 | 12/2010 | Grant et al. |
| 2011/0246879 | A1 | 10/2011 | White et al. |
| 2012/0079374 | A1 | 3/2012 | Gaddis |
| 2012/0204102 | A1 | 8/2012 | Gwin et al. |
| 2013/0007622 | A1 | 1/2013 | Ke et al. |
| 2013/0219024 | A1 | 8/2013 | Flack |
| 2014/0141875 | A1* | 5/2014 | Faria ..................... A63F 13/355 463/29 |
| 2014/0173417 | A1 | 6/2014 | He |
| 2014/0289855 | A1 | 9/2014 | Schulman et al. |
| 2015/0205772 | A1 | 7/2015 | Leventhal |
| 2016/0173925 | A1 | 6/2016 | Gordon et al. |
| 2017/0171252 | A1* | 6/2017 | Xue .................... H04L 65/1083 |
| 2017/0351484 | A1 | 12/2017 | Stuckman et al. |
| 2018/0123934 | A1 | 5/2018 | Gissing et al. |
| 2018/0205782 | A1 | 7/2018 | Wei et al. |
| 2019/0034213 | A1* | 1/2019 | Zweig ................. G06F 3/04842 |
| 2019/0079787 | A1* | 3/2019 | Toksoz ................ G06F 9/45504 |
| 2019/0392057 | A1* | 12/2019 | Denoue ................ G06F 40/106 |
| 2021/0203635 | A1 | 7/2021 | Shalikashvili et al. |
| 2021/0256200 | A1 | 8/2021 | Miller et al. |
| 2022/0004594 | A1* | 1/2022 | Smith ................... G06F 40/146 |

FOREIGN PATENT DOCUMENTS

| | | | |
|---|---|---|---|
| CN | 110196744 | A | 5/2019 |
| CN | 112882953 | A | 6/2021 |

OTHER PUBLICATIONS

Prestipino, "Modify Any Website in Real-Time with Sitemod.io & Chrome Developer Tools", pp. 1-3, Sep. 21, 2017 https://www.websitemagazine.com/blog/modify-any-website-in-real-time-with-sitemod-io-chrome-developer-tools.
"Sitemod.io—Fork Demo", pp. 1-1, YouTube Clip, last edited May 7, 2021 https://chrome.google.com/webstore/detail/sitemodio/efjbaneaebkanjmhengnedpllfdiocin?itemlang=te&hl=en.
Meclea, "Sitemod.io—Fork Demo", YouTube Clip, p. 1, Oct. 10, 2017 https://www.youtube.com/watch?v=COzKh56T0OM.
"Edit Any Website—No Code Required", pp. 1-6, year 2019-2022 https://goedit.me/.
Highsoft AS, "Highcharts", Software Sources Ltd., pp. 1-9, Jul. 30, 2021 https://software-sources.com/solutions/highsoft/.
Wikipedia, "Remote Desktop Protocol," pp. 1-11, last edited Sep. 21, 2021 https://web.archive.org/web/20210924044957/https://en.wikipedia.org/wiki/Remote_Desktop_Protocol.
"Microsoft Edge", p. 1, May 2015 https://www.techtarget.com/whatis/definition/Microsoft-Edge.
"Android—Login Screen," pp. 1-10, year 2022 https://www.tutorialspoint.com/android/android_login_screen.htm.
Wikipedia, "Selenium (Software)," pp. 1-6, last edited Sep. 21, 2021.
"Android Developers—WindowManager.LayoutParams—Flag_Secure," pp. 1-91, last updated Jul. 14, 2021 https://web.archive.org/web/20211005002148/https://developer.android.com/reference/android/view/WindowManager.LayoutParams.
"React Tutorial From Scratch: A Step-by-Step Guide," lbaslogic.com, pp. 1-27, year 2021 https://software-sources.com/solutions/highsoft/.
"AngularJS—Superheroic Java Script MNW Framework," Google, pp. 1-4, years 2010-2021 https://angularjs.org/.
"PagerDuty," PagerDuty, Inc., Google Play, pp. 1-3, Jun. 11, 2021 https://web.archive.org/web/20210624164153/https://play.google.com/store/apps/details?id=com.pagerduty.android.
"Mitmproxy is a Free and Open Source Interactive HTTPS Proxy," Mitmproxy Project, pp. 1-4, Sep. 26, 2021 https://mitmproxy.org/.
"Apktool—A Tool for Reverse Engineering Android apk Files," pp. 1-3, Sep. 16, 2021 https://web.archive.org/web/20210916012637/https://ibotpeaches.github.io/Apktool/.
"APK Downloder," Evozi, pp. 1-2, year 2020 https://apps.evozi.com/apk-downloader/.
"Android Developers," pp. 1-6, last updated Jul. 22, 2020 https://web.archive.org/web/20210812034151/https://developer.android.com/guide/topics/manifest/provider-element.
Hardt, Ed., "The OAuth 2.0 Authorization Framework," Request for Comments 6749, pp. 1-76, Oct. 2012.
"Square/okhttp," GitHub, Inc., pp. 1-5, Sep. 28, 2021 https://github.com/square/okhttp.
"Square/retrofit," Square, Inc., pp. 1-2, year 2013 https://github.com/square/retrofit.
"Android Developers—Network Security Configuration," pp. 1-12, Sep. 26, 2021 https://developer.android.com/training/articles/security-config.
"Mitmproxy docs—About Certificates," pp. 1-5, Sep. 22, 2021 https://web.archive.org/web/20210922085629/https://docs.mitmproxy.org/stable/concepts-certificates/.
"AppAuth-Android," GitHub, Inc., pp. 1-5, Sep. 12, 2021 https://web.archive.org/web/20210912131650/https://openid.github.io/AppAuth-Android/.
Tiberg et al., U.S. Appl. No. 17/746,981, filed May 18, 2022.
Bar Hakim et al., U.S. Appl. No. 17/959,319, filed Oct. 4, 2022.
International Application # PCT/US22/45592 Search Report dated Jan. 31, 2023.
U.S. Appl. No. 17/746,981 Office Action dated Aug. 11, 2023.
U.S. Appl. No. 17/959,319 Office Action dated Sep. 19, 2023.
International Application # PCT/US2023/065981 Search Report dated Aug. 4, 2023.
International Application # PCT/US2023/066801 Search Report dated Sep. 19, 2023.
U.S. Appl. No. 17/959,319 Office Action dated Jan. 31, 2024.
U.S. Appl. No. 17/959,319 Office Action dated Apr. 23, 2024.

* cited by examiner

VISUAL RECORDER FOR DEMONSTRATIONS OF WEB-BASED SOFTWARE APPLICATIONS

CROSS-REFERENCE TO RELATED APPLICATIONS

This application claims the benefit of U.S. Provisional Patent Application 63/253,135, filed Oct. 7, 2021, which is incorporated herein by reference.

FIELD OF THE INVENTION

The present invention relates generally to demonstration software, and specifically to recording, modifying, and presenting (i.e., playing back) a demonstration of a web-based software application.

BACKGROUND OF THE INVENTION

A product demo is typically used to present a software application such as a business-to-business software as a service application. The product demo can be used to show the value of a software application to a current or prospective customer, and typically involves a demonstration of the application's core features and capabilities.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including running by a web browser, a web-based application including a set of web pages, identifying, by a processor, changes in the web pages rendered by the web browser while running the web-based application, for each identified change, recording a corresponding state of the web-based application, wherein the corresponding state includes browser-executable code for a given web page being rendered, and recording one or more transitions from the corresponding state to one or more other states, compiling the recorded states and the recorded transitions into a state machine model of the web-based application, and generating a demonstration of the application using the state machine model.

In one embodiment, the web browser manages a document object model (DOM), and wherein identifying a given change includes identifying a change in the DOM.

In another embodiment, identifying a given change includes identifying a transition from a first given web page to a second given web page.

In an additional embodiment, identifying the change includes identifying a change in the browser-executable code for the given web page being rendered.

In a first change embodiment, the browser-executable code includes HyperText Markup Language (HTML) code.

In a second change embodiment, the browser-executable code includes Cascading Style Sheet (CSS) code.

In a third change embodiment, the browser-executable code includes JavaScript code.

In a further embodiment, the corresponding state includes one or more resources, and wherein identifying a given change includes identifying a change in a given resource in the given web page being rendered.

In a first state environment, the given resource includes an image.

In a second state environment, wherein the given resource includes a font.

In a third state environment, wherein the given resource includes an audio file.

In a fourth state environment, wherein the given resource includes a video file.

In a supplemental embodiment, the given resource includes an icon.

In one embodiment, a given transition is in response to an event including a user input, and wherein recording the transition includes recording the event.

In another embodiment, the web pages include web page elements, and the method further includes receiving an input including a modification to a given web page element, and saving, to the demonstration, the change to the given web page element.

In a first modification embodiment, the given web page element includes text.

In a second modification embodiment, the given web page element includes an image.

In a third modification embodiment, the given web page element includes a chart.

There is also provided, in accordance with an embodiment of the present invention, an apparatus including a memory configured to store a web browser, and one or more processors configured to execute the web browser, to run by the web browser, a web-based application including a set of web pages, to identify changes in the web pages rendered by the web browser while running the web-based application, for each identified change, to record a corresponding state of the web-based application, wherein the corresponding state includes browser-executable code for a given web page being rendered, and to record one or more transitions from the corresponding state to one or more other states, to compile the recorded states and the recorded transitions into a state machine model of the web-based application, and to generate a demonstration of the application using the state machine model.

There is additionally provided, in accordance with an embodiment of the present invention, a computer software product for controlling operation of a computer, including a non-transitory computer-readable medium, in which program instructions are stored, which instructions, when read by a computer, cause the computer to run by a web browser, a web-based application including a set of web pages, to identify changes in the web pages rendered by the web browser while running the web-based application, for each identified change, to record a corresponding state of the web-based application, wherein the corresponding state includes browser-executable code for a given web page being rendered, and to record one or more transitions from the corresponding state to one or more other states, to compile the recorded states and the recorded transitions into a state machine model of the web-based application, and to generate a demonstration of the application using the state machine model.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for recording and editing a demonstration (also referred to herein simply as a demo) of a web-based software application. As described hereinbelow, a web browser loads and runs a web-based application comprising a set of web pages. While running the web-based application, changes are identified in the web pages rendered by the web browser. For each identified change, corresponding state of the web-based application is recorded, wherein the corresponding state comprises browser-executable code for the web page being rendered, and one or more transitions from the corresponding state to one or more other states are also recorded. The recorded states and transitions are compiled into a state machine model of the web-based application, using the state machine model a demonstration of the application is created.

As described hereinbelow, the demonstration can be "played back" via a playback application. While playing back the recorded demonstration, the playback application can transition between and render, on a display, the states of the web pages recorded in the demonstration.

In one embodiment, the demonstration can be created by a user operating a client computer that accesses a virtual browser on a remote server. The virtual browser can execute an extension that generates (i.e., records) the demonstration. By having the virtual browser (i.e., on the remote server) execute this extension, a user can execute a "stock" browser on the client computer to access the virtual browser, thereby preventing any leakage of sensitive information that can occur if the extension would have been executed locally on the client computer. In another embodiment, the demonstration can be recorded by a browser extension executing on the client computer.

In an additional embodiment, the user on the client computer can edit the recorded demonstration by executing a web page editor (i.e., that executes as web-based application) that enables the user to edit the recorded demonstration. The web page editor enables the user to edit text, text attributes (e.g., fonts, text sizes and text formats), images and chart data in the recorded demonstration.

System Description

Figure 1:
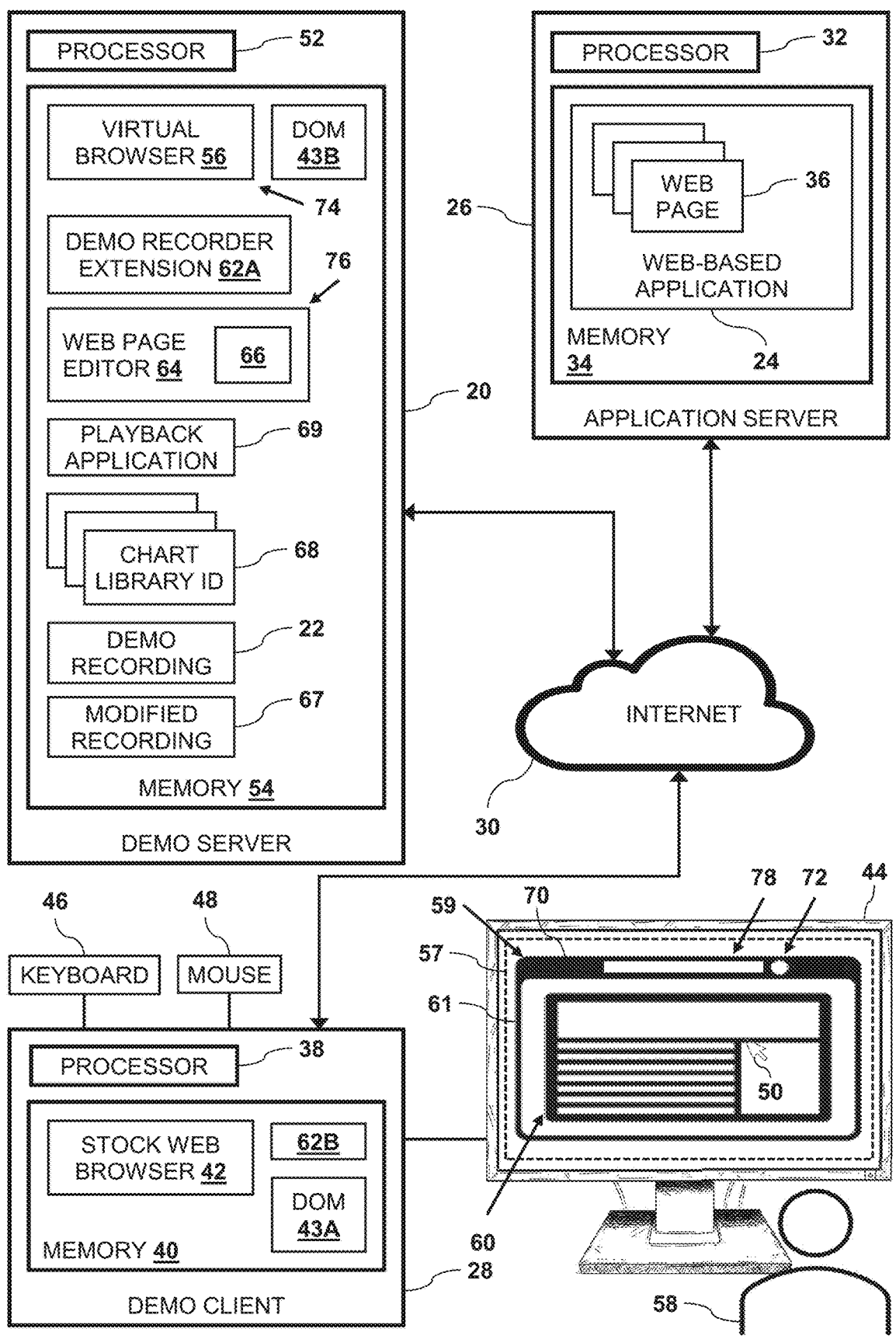
FIG. 1 is a block diagram that schematically illustrates a server computer executing a virtual browser that is configured to record a demo recording of a web-based software application comprising multiple web pages, in accordance with an embodiment of the present invention.

FIG. 1 is a schematic, pictorial illustration of a demo server 20 that is configured to create a demo recording 22 of a web-based software application 24 hosted by an application server 26, in accordance with an embodiment of the present invention. In the configuration shown in FIG. 1, demo server 20 can communicate with application server 26 and a demo client computer 28 over a public network 30 such as the Internet.

Application server 26 may comprise an application processor 32 and an application memory 34 that stores web-based application 24. In some embodiments, processor 32 executes web-based application 24 from memory 34. Web-based application 24 typically comprises multiple web pages 36 and additional software and data components that are described in the description referencing FIG. 2 hereinbelow.

Client computer 28 may comprise a client processor 38, a client memory 40 that stores a stock web browser 42. In embodiments described herein, stock web browser 42 may comprise any commercially available web browser such as EDGE™ (produced by MICROSOFT CORPORATION, Redmond WA, USA). In some embodiments processor 38 can execute stock web browser 42 to access websites on Internet 30 or to access web-based application 24 on application server 26. In the configuration shown in FIG. 1, client computer 28 may also comprise a display 44 and physical input devices such as a keyboard 46 and a mouse 48 that can be used to manipulate a cursor 50 on the display.

Demo server 20 may comprise a demo processor 52 and a demo memory 54. In addition to storing demo recording 22, memory 54 can also store a virtual web browser 56. Virtual browser 56 comprises a web browser such as the SELENUIM™ automation system executing a customized CHROMIUM™ (produced by ALPHABET INC., Mountain View, CA, USA) that executes on processor 52 but can be controlled remotely by a different computer such as client computer 28.

In some embodiments, demo server 20 and client computer 28 can communicate using a protocol that enables stock browser 42 to convey HyperText Markup Language (HTML) and Cascading Style Sheet (CSS) code to stock browser 42, which the stock browser can render as a virtual browser web page 60 on display 44 (i.e., within rendering 57). This protocol (typically running on top of Hypertext Transfer Protocol) enables the client computer to use stock browser 42 to remotely operate virtual browser 56. In other words, virtual browser generates a rendering of virtual browser web page 60, which web browser 43 presents within rendering 57.

To access virtual browser 56, stock browser 42 can present, on display 44, a web page rendering 57 comprising an address bar 59. A user 58 (i.e., operating client computer 28) can use keyboard 46 to input, to address bar 59, a Uniform Resource Locator (URL) 59 that corresponds to a web address (not shown) of virtual browser web page 60 on virtual browser 56, thereby enabling the virtual browser to be controlled/operated remotely by the user.

In some embodiments, the remote operation of virtual browser 56 comprises the virtual browser receiving input from keyboard 46 and mouse 48, and stock web browser 42 presenting, on display 44, a browser window 61 that presents output from the virtual browser such as web page 60. In this configuration, even though it appears, e.g., to user 58 of client computer 28, that stock browser 42 is accessing web page 60, virtual browser 56 executes code for web page 60, thereby isolating the web page code from the client computer.

In the configuration shown in FIG. 1, web browser 42 manages a document object model (DOM) 43A that represents web page rendering 57 that the web browser is currently presenting on display 44, and virtual browser 56 manages a DOM 43B that currently manages web page 60 (that web browser 42 renders on the display, as described supra). In embodiments herein, DOMs 43A and 43B may be referred to collectively herein as DOM 43.

In some embodiments, memory 54 may also comprise a demo recorder extension 62 that is configured to generate demo recording 22 using embodiments described herein. In embodiments herein, demo recorder extension 62 can be differentiated by appending a letter to the identifying numeral, so that the demo recorder extension comprises demo recorder extension 62A and demo recorder extension 62B. Demo recorder extensions 62A and 62B may be referred to collectively herein as demo recorder extension 62.

In the configuration shown in FIG. 1, virtual browser 56 can execute demo recorder extension 62A from memory 54, and stock web browser 42 can execute demo recorder extension 62B from memory 40. In one embodiment, as described hereinbelow, stock web browser 42 can access web-based application 24 via virtual browser 56, the virtual browser executes the web-based application, and demo recorder extension 62A can create demo recording 22. In another embodiment where stock web browser 42 directly accesses web-based application 24 (i.e., not via server 20), the stock web browser executes the web-based application, and demo recorder extension 62B can create demo recording 22.

In additional embodiments, memory 54 may further comprise a web page editor 64 that comprises a chart editor module 66. Web page editor 64 comprises a web-based application that stock browser 42 can retrieve from demo server 20 and then execute on processor 38. Once demo recording 22 is created, user 58 can use web page editor 64 and chart editor module 66 to modify the demo recording so as to create a modified recording 67 that editor 64 can store in memory 54, as described in the description referencing FIGS. 6-12 hereinbelow. While the configuration in FIG. 1 shows chart editor 66 as a software module of web page editor 64, configuring the chart editor as a standalone web-based application (e.g., executing on processor 38 from memory 40) is considered to be within the spirit and scope of the present invention.

In some embodiments, memory 54 may also comprise a list of chart library identifiers (IDs) 68. As described in the description referencing FIG. 6 hereinbelow, processor 52 can determine if any of web pages 36 comprise a given software library (e.g., HIGHCHARTS™, Produced by HIGHSOFT AS, Vik, Norway) that matches a given chart library ID 68.

When executing extension 62, virtual browser 56 can present, in browser window 61, a browser toolbar 70 that may comprise a record button 72 that when clicked on, toggles execution of demo recorder extension 62. Virtual browser 56 can also present, in browser window 61, an address bar 78 in which user 58 can input a URL indicating a web address for the virtual browser to access. In some embodiments a browser URL 74 references virtual browser 56 and an editor URL 76 references web page editor 64. Therefore, user 58 can launch virtual browser 56 by entering URL 74 into address bar 78 and can launch web page editor 64 by entering URL 76 into the address bar.

As described hereinbelow, upon activating demo recorder extension 62, client computer 28 can execute, via virtual browser 56, web-based application 36, record interactions (i.e., input and output) with the web-based application, and store the recorded interactions to demo recording 22. Editor 64 can then be executed to edit and customize demo recording 22, as described in the description referencing FIGS. 6-12 hereinbelow.

In the configuration shown in FIG. 1, memory 54 comprises a playback application 69. In one embodiment, playback application comprises a web-based application hosted be demo server 20 that user 58 can access via stock web browser 42 so as to load and "play back" demo recording 22. In another embodiment (not shown), playback application 69 may comprise a standalone application that can execute on processor 38 (i.e., from memory 40) so as to load and play back demo recording 22. Using playback application 69 to play back demo recording 22 is described in the description referencing FIG. 13 hereinbelow.

Processors 32, 38 and 52 comprise general-purpose central processing units (CPU) or special-purpose embedded processors, which are programmed in software or firmware to carry out the functions described herein. This software may be downloaded to demo server 20, application server 26 and client computer 28 in electronic form, over a network, for example. Additionally or alternatively, the software may be stored on tangible, non-transitory computer-readable media, such as optical, magnetic, or electronic memory media. Further additionally or alternatively, at least some of the functions of processors 32, 38 and 52 may be carried out by hard-wired or programmable digital logic circuits.

Examples of memories 34, 40 and 54 include dynamic random-access memories and non-volatile random-access memories. Additionally or alternatively, the memories may comprise non-volatile storage devices such as hard disk drives and solid-state disk drives.

In some embodiments, the functionality of some or all of demo server 20, application server 26 and client computer 28 may be deployed in a data cloud and/or as virtual machines in one or more physical computer systems. In one embodiment, the respective functionalities of demo server 20 and application server 26 may ach be distributed over multiple physical and/or virtual computers.

Figure 2:
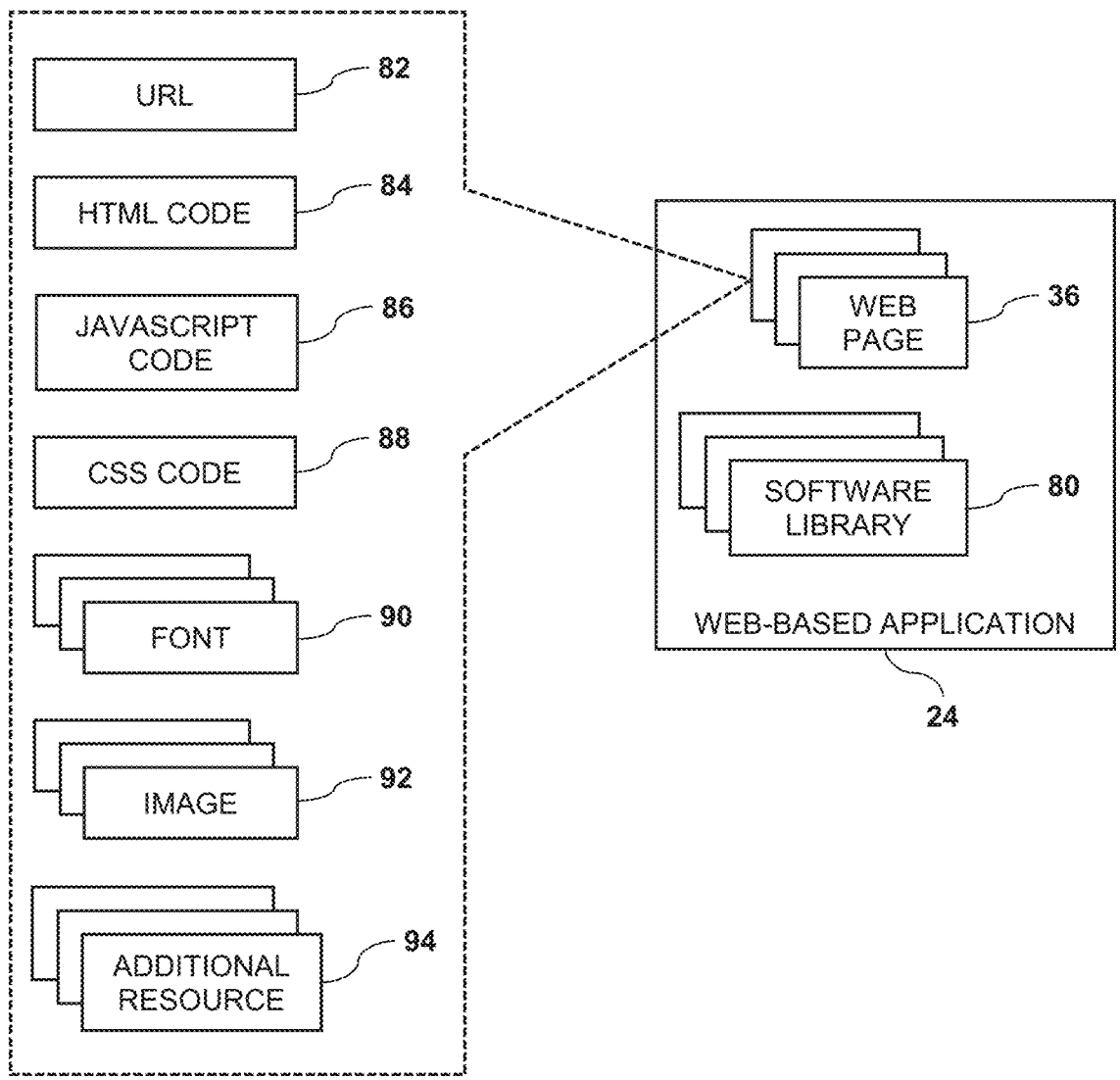
FIG. 2 is a block diagram that schematically illustrates software and data components of the web-based application, in accordance with an embodiment of the present invention.

FIG. 2 is a block diagram that schematically illustrates software and data components of web-based application 24, in accordance with an embodiment of the present invention. In addition to web pages 36, web-based application 24 may also comprise one or more software libraries 80. Examples of software libraries 80 include, but are not limited to, chart libraries (e.g., HIGHCHARTS™) and other JavaScript libraries/frameworks such as REACT, ANGULAR and VUE.

In the configuration shown in FIG. 2, each web page 36 may comprise a URL 82, HyperText Markup Language (HTML) code 84, JavaScript code 86, CSS code 88, one or more fonts 90, one or more images 92 and one or more additional resources 94. Examples of additional resources 94 include, but are not limited to, icons, audio files and video files.

When a web browser (e.g., browser 42 or browser 56) executes and presents a given web page 36, the given web page may have different states, wherein each of the states comprises modifications made by JavaScript code 86 to HTML code 84 in response to events such as a user input (i.e., from user 58) such as a click by mouse 48, a hover (e.g., by the mouse positioning cursor 50 over a specific area of the given web page) and input from keyboard 46. One example of a state change to a given web page 36 is to generate and present a drop-down box in response to input from keyboard 46 or mouse 48.

Figure 3:
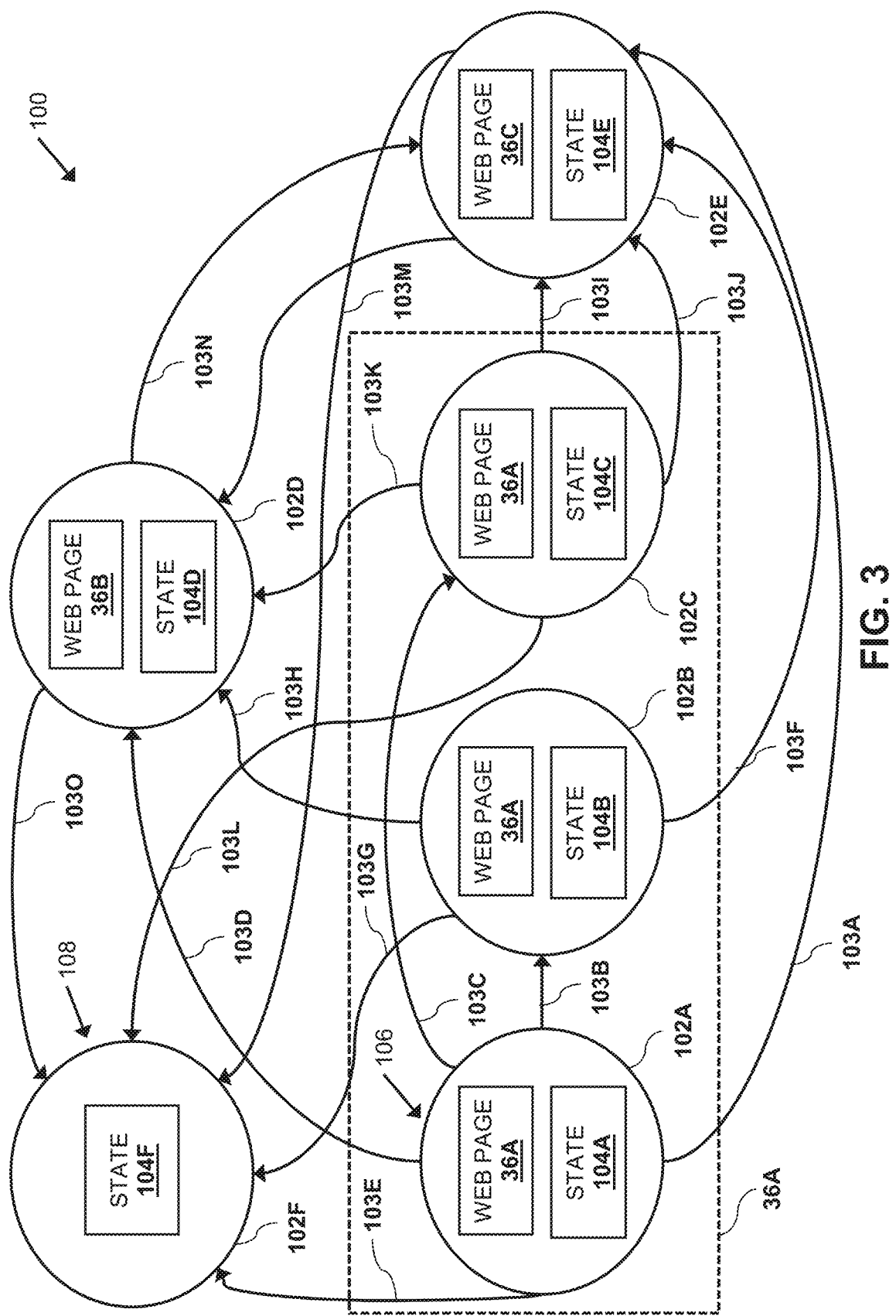
FIG. 3 is a state machine comprises a directed graph whose nodes that represent the web pages and their respective states, in accordance with an embodiment of the present invention.

FIG. 3 shows a state machine (i.e., a directed graph) 100 comprising web page state nodes 102 that reference web pages 36 and their respective states 104, and edges 103 that reference transitions between the web state nodes, in accordance with an embodiment of the present invention. In some embodiments, each node 102 in state machine 100 corresponds to a given state of a given web page 36 that virtual browser 56 accesses in web-based application 24 when creating demo recording 22.

In FIG. 3, web pages 36, nodes 102, edges 103, and states 104 can be differentiated by appending a letter to the identifying numeral, so that the web pages comprise web pages 36A-36C, the nodes comprise nodes 102A-102F, the edges comprise edges 103A-103O, and the states comprise states 104A-104F.

In other words, each given node 102 comprises the a given state 104 of a given web page 36 in recording 22. In the example shown in FIG. 3:
  Web page 36A comprises is the first web page in web-based application 24 accessed by user 58 while demo recorder extension 62 generated recording 22. In some embodiments web page 36A may comprise the home page of web-based application 24.
  State 104A comprises the first state 104 of web page 36A browser 56 presented (i.e., via browser 42) to user 58 while recorder extension 62 generated recording 22. Therefore, state 104A can be referenced herein as a starting state 106.
  In state machine 100:
  States 104A, 104B and 104C for web page 36A are referenced respectively by nodes 102A, 102B and 102C.
  Node 102D references web page 36B that has a single state 104D.
  Node 102E references web page 36C that has a single state 104E.
  Node 102F can be accessed from any other node 102, and comprises state 104F that indicates termination of web-based application 24. Therefore, state 104F can be referenced herein as an ending state 108.

Figure 4:
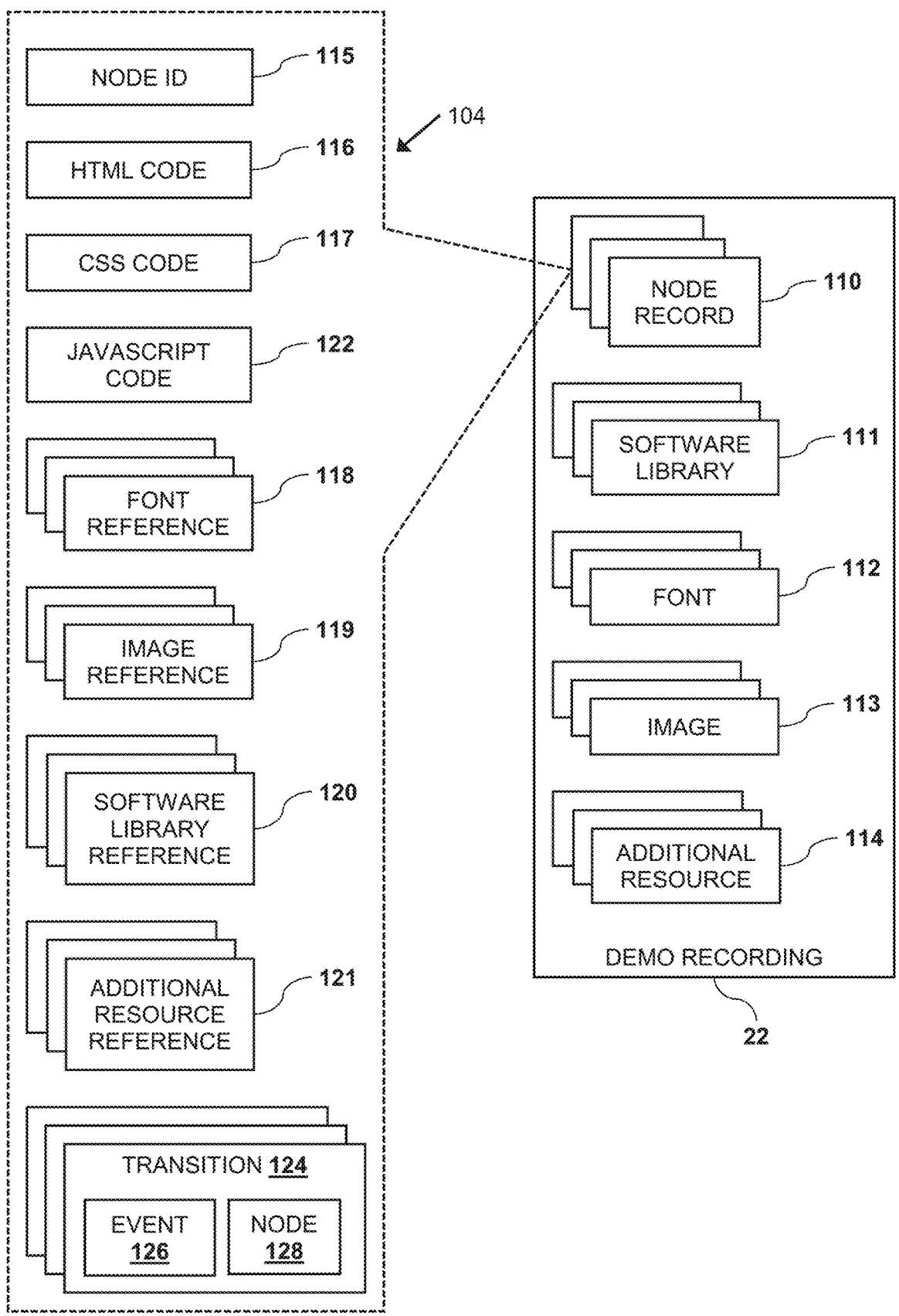
FIG. 4 is a block diagram that schematically illustrates software and data components of the recorded demo of the web-based application, in accordance with an embodiment of the present invention.

FIG. 4 is a block diagram that schematically illustrates software and data components of demo recording 22, in accordance with an embodiment of the present invention. In the configuration shown in FIG. 4, demo recording 22 comprises:
  A set of node records 110, which are described hereinbelow.
  One or more software libraries 111 that comprise respective copies of one or more software libraries 80 used by all web page state nodes 102 in state machine 100.
  One or more fonts 112 that comprise respective copies of the one or more fonts 90 used by all web page state nodes 102 in state machine 100.
  One or more images 113 that comprise respective copies of the one or more images 92 used by all web page state nodes 102 in state machine 100.
  One or more additional resources 114 that comprise respective copies of the one or more additional resources 94 used by all web page state nodes 102 in state machine 100.

As described supra, each node 102 references a given state 104 of a given web page 36 that virtual browser 56 accessed in web-based application 24 while creating demo recording 22. In some embodiments node records 110 have a one-to-one correspondence with nodes 102, and each the node records stores a current state of the DOM of its corresponding node 102. In these embodiments, each node record 110 can store information such as:
  A unique node identifier (ID) 115 that corresponds to URL 82 in the corresponding web page state node.
  HTML code 116 that comprise a copy of HTML code 84 in the corresponding web page state node.
  CSS code 117 that comprises a copy of CSS code 88 in the corresponding web page state node.
  JavaScript code 122 that comprises a copy of any JavaScript code 86 that a web browser (e.g., web browser 42) executes so as to render of the corresponding web page state 102.
  One or more font references (i.e., pointers) 118 that respectively reference one or more fonts 112 used by the corresponding web page state node.
  One or more image references 119 that respectively reference one or more images 113 used by the corresponding web page state node.
  One or more software library references 120 that respectively reference one or more software libraries 111 that demo recorder extension 62 detected in the JavaScript code in the corresponding web page state node. For example, a chart library (i.e., a given software library 111) can have a record in the JavaScript code that looks like:
    (Target HTML Element, Chart Data, Chart Design).
  In this example, demo recorder extension 62 can store, to a given software library reference 120, this triplet as well as the specific detected chart library as follows:
    (HighCharts V9.2,
    <HTML reference to a specific spot on the page>,
    Chart data to load,
    Chart design to use).
  One or more additional resource references 121 that respectively reference one or more additional resources 114 used by the corresponding web page state node.
  One or more transitions 124 comprising respective events 126 and nodes 128. Transitions 124 correspond to edges 103 in state machine 100 (FIG. 3).
  When executing (i.e., on browser 42 or 56), web-based application 24 can transition from a first state 104 to a second state 104 in response to given event. In one example, web-based application 24 can present a first web 36 and transition to a second web page 36 upon receiving an input indicating user 58 clicked on a specific element on the first web page. In this example, event 126 comprises the "click" input, and transition 128 comprises the node corresponding to the initial state of the second web page.

In a second example, web-based application 24 can present a first state 104 of given web 36 and transition to a second state 104 of the given web page 36 upon receiving an input indicating user 58 "hovered" over a specific element on the first web page. In this example, the second state may comprise a drop-down menu, event 126 comprises the "hover" input, and transition 128 comprises the node corresponding to the second state of the given web page.

In some embodiments, each given node record 110 stores the current state 104 of the web page of the given node record's corresponding node 102. In the configuration shown in FIG. 4, the current state comprises "static snapshots" (i.e., of the currently rendered web page 36) of HTML code 116, CSS code 117, JavaScript code 122, and references 118, 119, 120 and 121.

Demo Recording Editing and Playback

Figure 5:
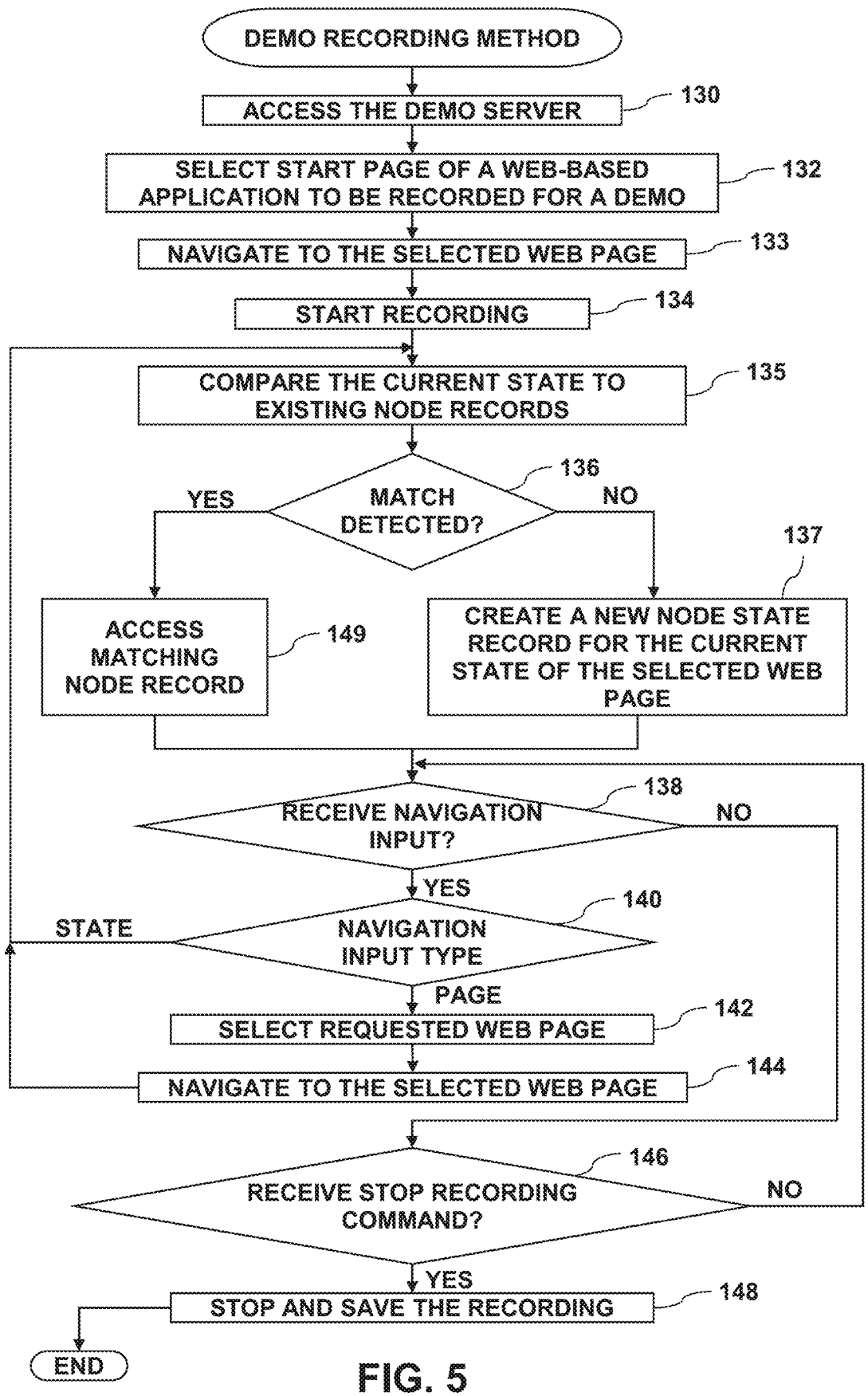
FIG. 5 is a flow diagram that schematically illustrates a method of recording a demo recording of the web-based application, in accordance with an embodiment of the present invention.

FIG. 5 is a flow diagram that schematically illustrates a method of creating demo recording 22, in accordance with an embodiment of the present invention.

In step 130, stock browser 42 accesses virtual browser 56 on demo server 20. To access the virtual browser, user 58 can use keyboard 46 to input URL 74 to address bar 59 in stock browser 42. In response to receiving this input, stock browser 42 can access web page 60 (i.e., via virtual browser 56) which presents browser window 61.

In step 132, user 58 selects a given web page 36 of web-based application 24. In the example shown in FIG. 1, the selected web page comprises web page 36A, referenced by start node 106.

In step 133, virtual browser 56 navigates to the selected web page and presents the selected web page in browser window 61. To select the selected web page, user 58 can input the URL of the given web page into address bar 78, and in response to the input, virtual browser 56 can access and present the given web page in browser window 61.

In step 134, demo recorder extension 62 starts recording demo recording 22. In the configuration shown in FIG. 1, the demo recording extension can start recording in response to user 58 clicking on record button 72. In another embodiment, the demo recording extension can start recording in response to user 58 initiating execution of virtual browser 56 (i.e., by entering URL 74 into stock browser 42.

In step 135 demo recorder extension 62 identifies a current state of the selected web page, and compares the current state to states 104 in node records 110. The reason for this is that browser 56 may generate a given state 106 (i.e., of a given web page 36) more than one time while generating recording 22. For example, as shown in FIG. 3, states 104A, 104B, 104C and 104D can all transition, respectively via edges 103E, 103G, 103L, 103M and 1030, to state 104E.

In step 136, if demo recorder extension 62 detects a match, then in step 137, demo recorder extension 62 creates a new node record 110 for the current state of the given (i.e., selected) web page. As described supra, the new node record stores HTML code 84 and CSS code 88 for the current state of the given web page, as well as any references 118, 119, 120 and 121 that respectively reference fonts 112, images 113, software libraries 111 and additional resources 114 used by the current state of the given web page. Additionally, if extension 62 detects that the current state of the given web page use one or more resources (i.e., software library 80 fonts 90, images 92 and additional resources 94) not currently stored in demo recording 22, then the demo recorder extension can respectively store, to the demo recording, the detected one or more resources to software libraries 111, fonts 112, images 113 and additional resources 114.

In some embodiments resources 94 may comprise information used by a given software library used by the current state of the given web page. For example, if the current state of the given web page comprises a chart and a given software library comprises a chart library, additional resources 94 may comprise data that the chart library can use to generate the chart.

In step 138, if virtual browser 56 receives a navigation input from user 58, then in step 140, the virtual browser determines the navigation input type. In embodiments described herein, the navigation input types may comprise a state change to the given web page (e.g., in response to user 58 clicking on or hovering over a web page element, the state change may comprise generating a drop-down list) or a request to navigate to a different web page 36 (e.g., in response to user 58 clicking on a link on the given web page). In some embodiments, the state change may comprise a change to HTML code 116, CSS code 116, JavaScript code 122, a given font 112, a given image 113 or a given additional resource 114.

If the received navigation input type is for a state change in the selected web page, then the method continues with step 135. However, if the received navigation input type is a request to navigate to a different web page 36, then in step 142, virtual browser 56 selects the requested web page. In step 144, upon selecting the requested web page, virtual browser 56 navigates to the selected web page and presents the selected web page in browser window 61, and the method continues with step 135.

Prior to continuing with step 136 (i.e., either from step 140 or step 144, demo recorder extension 62 adds a new transition 124 to the current node state record, populates, in the current node state record, event 126 with the navigation input type (i.e., from step 140), and populates, in the current node state record, node 128 with the node ID for the node record indicated by the selected web page.

Returning to step 138, if virtual browser 56 does not receive a navigation input, then in step 146, processor 52 checks if the virtual browser received a stop recording command. In some embodiments, the stop recording input may comprise virtual browser 56 receiving a click input from mouse 48 while cursor 50 is positioned on record button 72. In other embodiments, the stop recording command may comprise virtual browser 56 detecting that stock web browser 42 has stopped executing (i.e., disconnected) from the virtual browser.

Upon receiving the stop command, recorder extension 62 can generate new node record 110 corresponding to end node 108. In another embodiment, as described supra, recorder extension 62 can generate the new node record 110 corresponding to end node 108 upon virtual browser 56 detecting an end to the execution of web-based application 24.

If virtual browser 56 does not receive a stop recording command, then the method continues with step 138. However, if virtual browser 56 receives a stop recording input, then in step 148, demo recorder extension 62 stops recording demo recording 22, compiles (i.e., into a format that can be read by playback application 69) and saves the demo recording and the method ends.

Returning to step 136, if demo recorder extension 62 does detects a match, then in step 149, the demo recorder extension accesses the matched node record 110, and the method continues with step 138

In embodiments of the present invention, demo recording 22 comprises a set of node records 110 that correspond to web page state nodes 102 of web-based application 24 that user 58 traverses and accesses during the recording process described in the description referencing the flow diagram in FIG. 5 hereinabove. In addition to text, images and user-input fields, the node records can store relationships between events (e.g., a pressed button or a "hover") and their respective results (i.e., a different web page 36 or a change to the state of the current web page 36).

For example, as described hereinabove, each node ID 115 may have a corresponding URL. Therefore, if the result of a given event comprises the web application transitioning to a different web page 36 having a corresponding URL, a given node record 110 can store the node ID corresponding to the URL.

Additionally, using systems implementing embodiments of the present invention, user 58 can create demo recording 22 without any need to execute any browser extension in stock browser 42 executing on processor 38. This can enhance security of client computer 28 since browser extensions typically have access to information in any open tab in browser 42.

Figure 6:
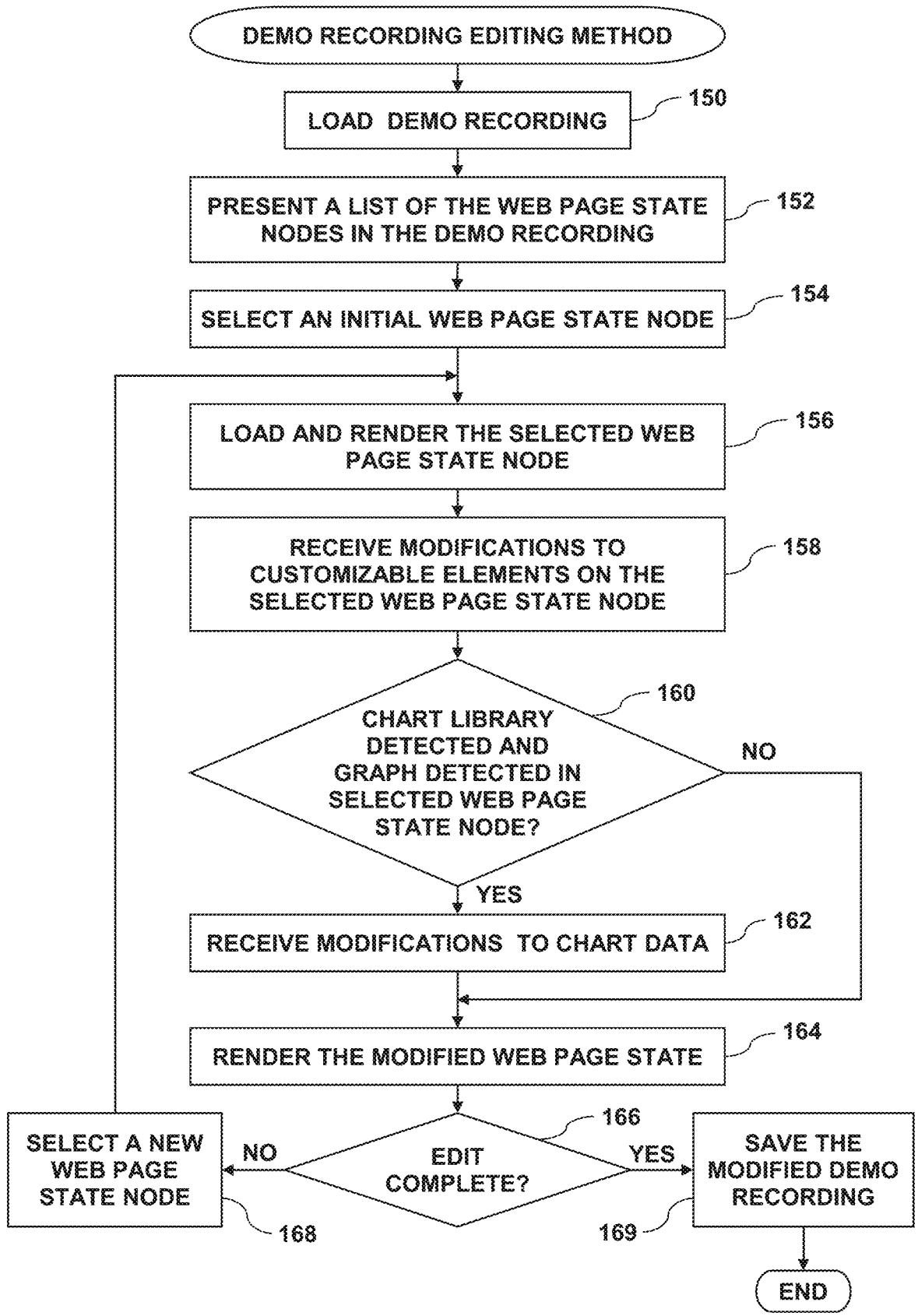
FIG. 6 is a flow diagram that schematically illustrates a method of editing the demo recording of the web-based application, in accordance with an embodiment of the present invention.

FIG. 6 is a flow diagram that schematically illustrates a method of editing the recorded demo of web-based application 24, in accordance with an embodiment of the present invention. In embodiments described herein, user 58 can initiate the editing of demo recording 22 by launching web page editor 64 on stock web browser using embodiments described hereinabove.

In step 150, web page editor 64 loads demo recording 22. As described supra, demo recording 22 comprises a plurality of node records 110, each of the node records corresponding to a respective web page state node 102 and storing the necessary information for browser 42 or browser 56 to present a given state 104 of a given web page 36 on display 44.

In step 152, web page editor 64 presents, to user 58 on display 44, icons corresponding to a list of nodes 102.

Figures 7, 8, 9:
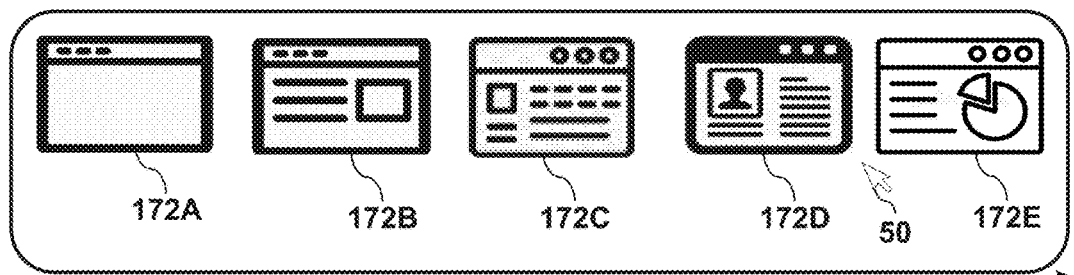
FIG. 7 is a schematic pictorial illustration of a list of icons that correspond to the nodes in the state machine, in accordance with an embodiment of the present invention.
FIG. 8 is a schematic pictorial illustration of a first example web page state in the demo recording, in accordance with an embodiment of the present invention.
FIG. 9 is a schematic pictorial illustration of an edited version of the first example web page state, in accordance with an embodiment of the present invention.

FIG. 7 is a schematic pictorial illustration of a list 170 of icons 172 corresponding to nodes 102 that web page editor 64 can present on display 44, in accordance with an embodiment of the present invention. In FIG. 7, icons 172 can be differentiated by appending a letter to the identifying numeral, so that the web pages comprise icons 172A-172E. In embodiments described herein, icon 172A corresponds to node 102A (FIG. 3), icon 172B corresponds to node 102B, icon 172C corresponds to node 102C, icon 172D corresponds to node 102D and icon 172E corresponds to node 102E.

Returning to FIG. 6, in step 154, user 58 selects an initial web page state node 102 to edit in web page editor 64. In some embodiments, user 58 can select the initial web page state node by selecting a given icon 172 (e.g., by manipulating mouse 48 to position cursor 50 over the given icon and clicking on the mouse), thereby indicating intent to edit corresponding node 102, and in step 156, web page editor 64 loads the node record for the corresponding web page state node and renders, on display 44, the state of the web page in the corresponding web page state node.

FIG. 8 is a schematic pictorial illustration of a given web page state node 102 in demo recording 22 comprising modifiable web page elements 180-190 that can be edited by web page editor 64, in accordance with an embodiment of the present invention.

In the example shown in FIG. 8, the given web page state node comprises web page 36B in node 102D and comprises modifiable web page elements 180-190. In this example the modifiable web page elements comprise:

Element 180 comprises text for an entity (e.g., company) name.

Element 182 comprises an image, e.g., a corporate logo.

Elements 184 and 186 comprise text entries for the entity's name, address and contact information.

Element 188 comprises a text title for a table 192.

Elements 190 comprise text headers for table 192.

Charts as described hereinbelow.

Returning to FIG. 6, in step 158, web page editor 64 receives, from user 58 (i.e., via keyboard 46 and mouse 48), modifications to web page 36B in node 102D. In some embodiments, user 58 can edit multiple web page state nodes 102 in web page editor 64. For example, web page editor 64 may comprise a "search and replace" feature (similar to the search/replace features commonly found in word processors) that can replace the text in all the web page state nodes at once, or even let user 58 specify which changes to effect.

FIG. 9 is a schematic pictorial illustration of a modified version of web page 36B in web page state node 102D, in accordance with an embodiment of the present invention. As shown in FIG. 9 modifications comprise text edits to elements 180 and 184-190, and a replacement image in element 182.

While FIGS. 8 and 9 show text modification to web page 36B, other modifications to web page 36B are considered to be within the spirit and scope of the present invention. For example, web page editor 64 may allow user 58 to change fonts, sizes and text attributes (e.g., bold, underline, italic) of elements 180 and 184-190.

Returning to FIG. 6, in step 160, web page editor 64 checks to see if any given software library 111 in the selected web page state node (i.e., the web page state node selected in step 154) matches any given chart library ID 68. If there is a match, then the web page editor initiates execution of chart editor module 66 to enable modification of any charts in the selected web page state node.

Figure 10:
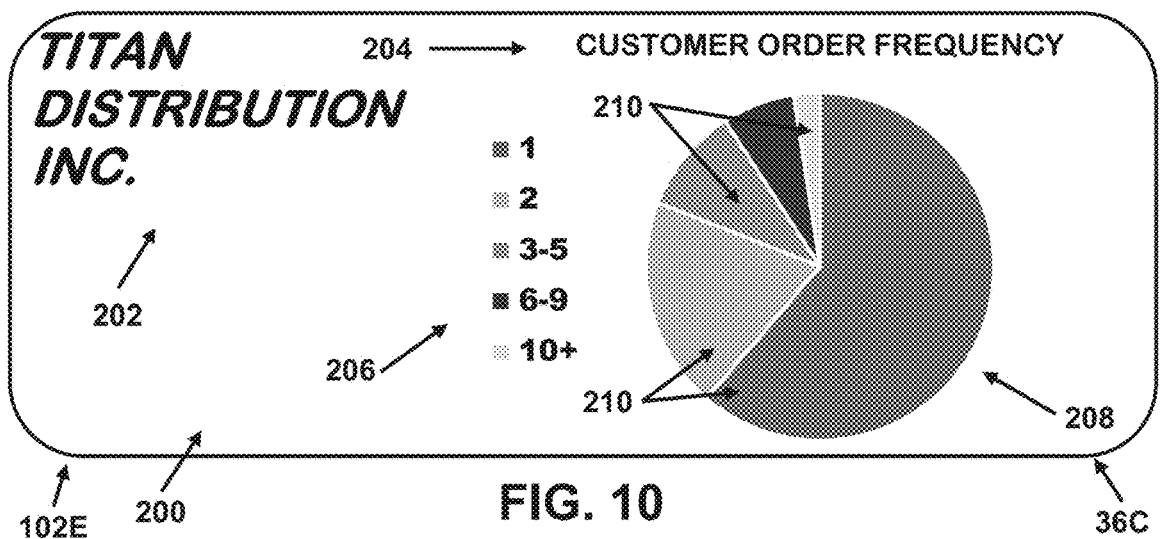
FIG. 10 is a schematic pictorial illustration of a second example web page state in the recorded demo that comprises a pie chart, in accordance with an embodiment of the present invention.

FIG. 10 is a schematic pictorial illustration of a given web page state node 102 in demo recording 22 comprising a chart 200 that can be edited by web page editor 64, in accordance with an embodiment of the present invention. In the example shown in FIG. 10, the given web page state node comprises web page 36C in node 102E, and chart 200 comprises a company name 202, a chart title 204, a chart legend 206 and a pie chart 208.

Returning to FIG. 6, in step 162, web page editor 64 receives, from user 58 (i.e., via keyboard 46 and mouse 48), modifications to chart 200.

Figure 11:
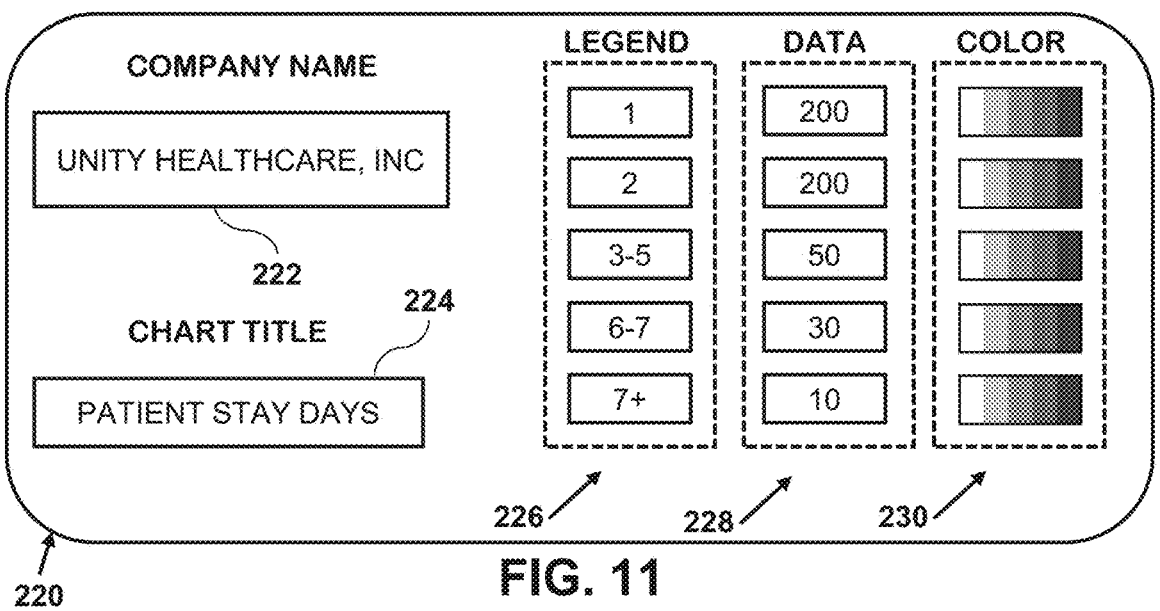
FIG. 11 is a schematic pictorial illustration of a chart editing tool, in accordance with an embodiment of the present invention.

FIG. 11 is a schematic pictorial illustration of a chart edit screen 220 that web page editor 64 can present on display 44, in accordance with an embodiment of the present invention. In the example shown in FIG. 11, chart edit screen 220 comprises modifiable chart elements 222-230. In this example the modifiable web page elements comprise:

Element 222 comprises text for company name 202.

Element 224 comprises text for chart title 204.

Elements 226 comprise respective text/numeric entries for legend 206.

Elements 228 comprise respective data values that the given chart library uses to construct slices 210.

Elements 230 comprise respective color/shading selections for slices 210.

Figure 12:
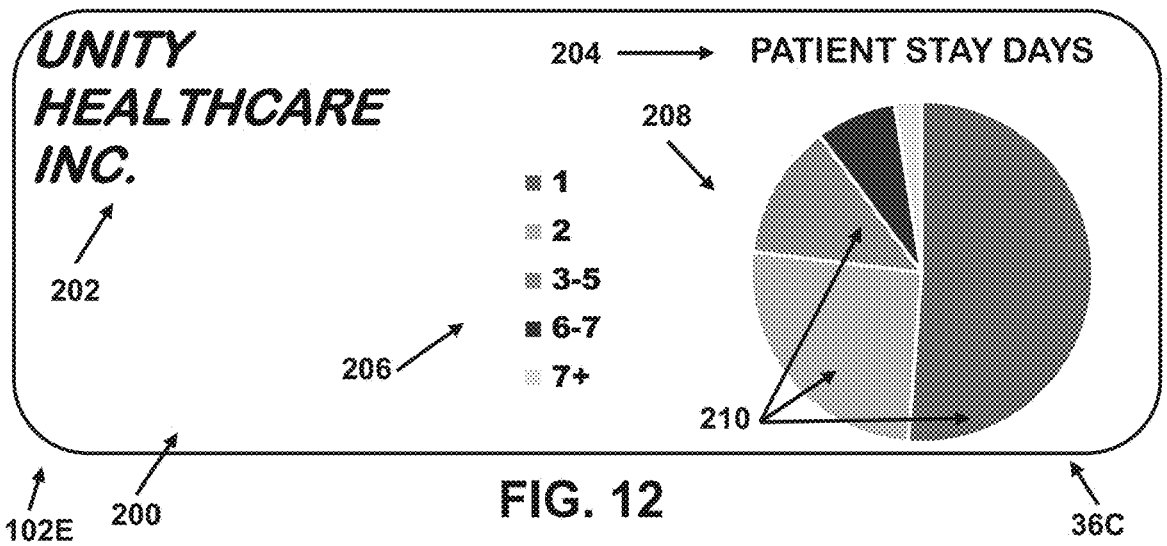
FIG. 12 is a schematic pictorial illustration of an edited version of the second example web page state comprising an updated pie chart, in accordance with an embodiment of the present invention.

FIG. 12 is a schematic pictorial illustration of an edited version of chart 200, in accordance with an embodiment of the present invention. As shown in FIG. 12 modifications comprise edits to elements 202-206, and edits to data values 228 that result in resized slices 210.

While FIGS. 10-12 show simple modifications to chart 200, other (and more complex) modifications to the chart are considered to be within the spirit and scope of the present invention. In one embodiment, chart editor module 66 may allow user 58 to change chart 200 to a different chart type (e.g., a line chart or a bar chart). In another embodiment chart editor module 66 may allow user 58 to change the scale of chart 200.

Returning to FIG. 6, in step 164, web page editor 64 renders, on display 44, the modified web state, e.g., as shown in FIGS. 9 and 12.

Finally, in step 166, if user 58 wants to perform additional edits to demo recording 22, then in step 168, the user selects a new web page state node 102 to edit in web page editor 64, and the method continues with step 156. In one embodiment, user 58 can select the new web page state node using embodiments described in the description referencing step 154 hereinabove.

In another embodiment, user 58 can select the new web page state node by selecting the new web page state node while editing the current web page state node (i.e., the current web page state node being edited). For example, if the current (i.e., currently being edited) web page state node comprises a link to the new web page state node, then the user can select the new web page state node by clicking on the link.

Returning to step 166, if user 58 has completed all necessary edits to demo recording 22, then in step 169, virtual browser 56 saves the modifications (i.e., made by web page editor 64) to demo recording 22 as modified recording 67, and the method ends.

Returning to step 160, if web page editor 64 does not detect, in the selected web page state node (i.e., the web page state node selected in step 154), any software library 111 that matches any given chart library ID 68, then the method continues with step 164.

In embodiments herein a recorded demo may refer to either demo recording 22 or modified recording 67. As described supra, the recorded demo comprises a set of node records 110 that correspond to web page state nodes 102 in state machine 100. Once loaded, browsers 42 or 56 can "surf" these nodes in a manner similar to the way the corresponding web pages 36 nodes were accessed when creating the recorded demo.

Upon virtual browser 56 (i.e., executing extension 62) creating the recorded demo, the recorded demo can be "played back" using one of the following embodiments:

In a first embodiment, stock browser 42 can load the recorded demo from demo server 20, and execute (i.e., traverse and enter data into the nodes) the recorded demo in the stock browser (i.e., without using virtual browser 56).

In a second embodiment, processor 38 can request that processor 52 transfer the recorded demo to client computer 28. Upon client computer 28 receiving the recorded demo, stock browser 42 can load and execute the recorded demo in a manner similar to the second embodiment.

As described supra, virtual browser 56 executes extension 62 to create demo recording 22, and executes extensions 64 and 66 to create modified recording 67. However, when playing back the recorded demo, stock browsers 42 and 56 can execute the recorded demo without a need to execute any extension(s).

Figure 13:
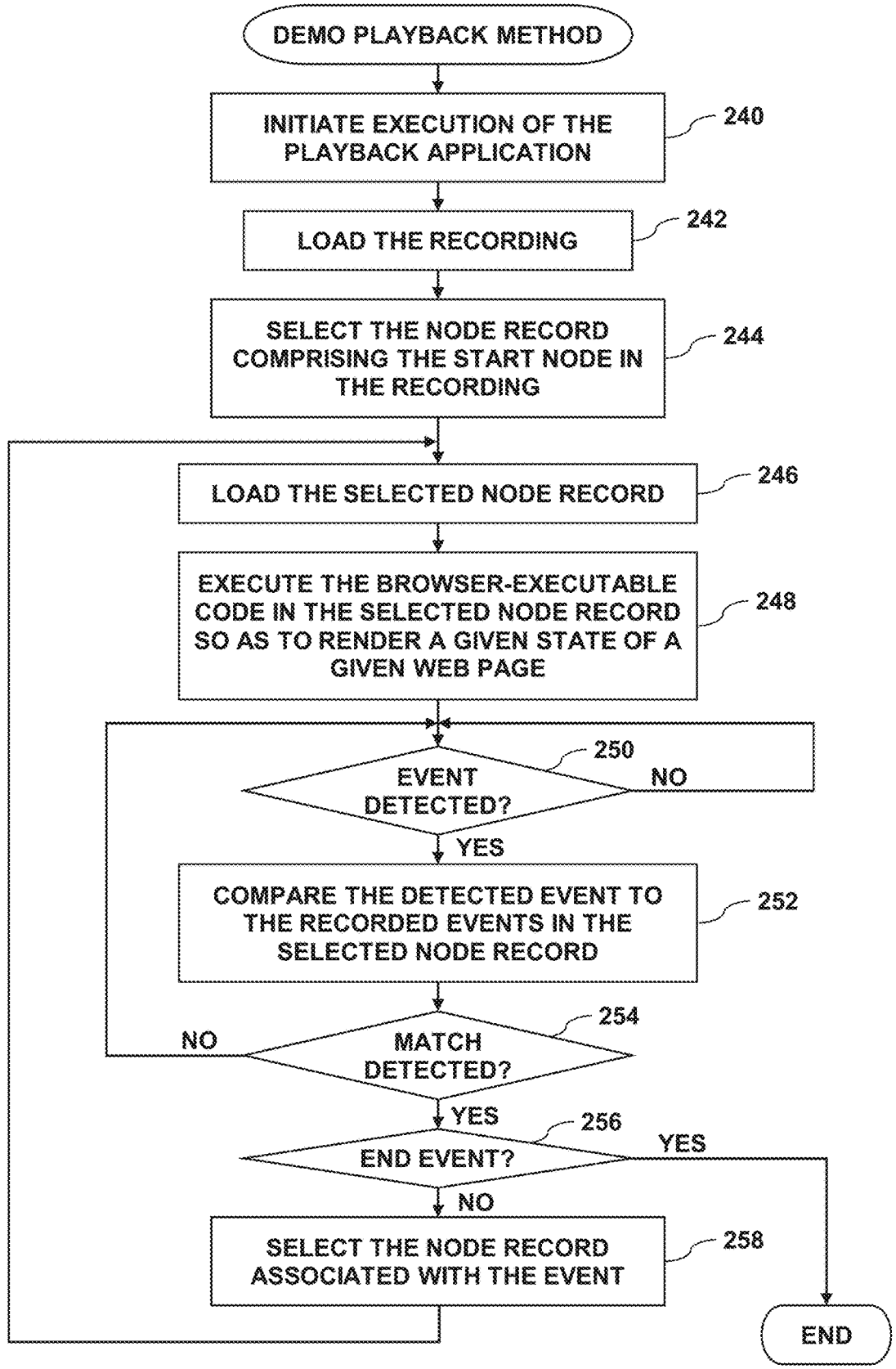
FIG. 13 is a flow diagram that schematically illustrates a method of playing (i.e., viewing) the demo recording of the web-based application, in accordance with an embodiment of the present invention.

FIG. 13 is a flow diagram that schematically illustrates a method of playing back demo recording 22, in accordance with an embodiment of the present invention.

In step 240, processor 52 initiates execution of playback application 69, typically in response to an input received from user 58. In an alternative embodiment, as described supra, processor 38 can initiate execution of playback application 69.

In step 242, playback application 69 loads recording 22, and in step 244, the playback application selects the node record comprising start node 106.

In step 246, playback application 69 loads the selected node record, and in step 248, the playback application executes the browser-executable code (i.e., code 116, 117 and 122) so as to render, on display 44, state 104 of the selected node record.

In step 250, if playback application 69 detects an event (e.g., an input indicating that user 58 positioned or clicked on mouse 48), then in step 252, the playback application compares the received event to event(s) 126 in the selected node record.

In step 254, if playback application 69 detects that the detected event matches a given event 126 in the selected node record, then in step 256, the playback application analyzes the corresponding (i.e., to the given event) node 128 in the selected node record so as to determine whether or not the corresponding node comprises end node 108. If the corresponding node is not the end node, then in step 256, playback application 29 selects the corresponding node, and the method continues with step 246.

Returning to step 256, if the corresponding node comprises end node 108, then the method ends.

Returning to step 254, if playback application 69 does not detect match between the detected event and any given event 126 in the selected node record, then the method continues with step 246.

Returning to step 250, if playback application 29 does not detect an event, then the method continues with step 250.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    running by a web browser, a web-based application comprising a set of web pages;
    compiling, by a processor, a state machine model of the web-based application, the state machine model comprising a directed graph comprising nodes corresponding to respective states of the web pages and edges corresponding to transitions between the states,
    wherein the state machine model is compiled while running the web-based application by:

identifying changes in the web pages rendered by the web browser; and for each identified change, recording a corresponding state of the web-based application as one of the nodes in the directed graph and recording one or more transitions from the corresponding state to one or more other states as the edges in the directed graph;

generating a demonstration of the application by receiving user selections of one or more of the nodes in the state machine model and modifications of the respective states of the corresponding nodes, and updating the state machine model based on the modifications; and playing back the demonstration using the updated state machine model.

2. The method according to claim 1, wherein the web browser manages a document object model (DOM), and wherein identifying the changes comprises identifying a change in the DOM.

3. The method according to claim 1, wherein recording the one or more transitions comprises identifying a transition from a first given web page to a second given web page.

4. The method according to claim 1, wherein identifying the changes comprises identifying a change in the browser-executable code for the given web page being rendered.

5. The method according to claim 4, wherein the browser-executable code comprises HyperText Markup Language (HTML) code.

6. The method according to claim 4, wherein the browser-executable code comprises Cascading Style Sheet (CSS) code.

7. The method according to claim 4, wherein the browser-executable code comprises a script.

8. The method according to claim 1, wherein the corresponding state comprises one or more resources, and wherein identifying the changes comprises identifying a change in a given resource in a given web page being rendered.

9. The method according to claim 8, wherein the given resource comprises an image.

10. The method according to claim 8, wherein the given resource comprises a font.

11. The method according to claim 8, wherein the given resource comprises an audio file.

12. The method according to claim 8, wherein the given resource comprises a video file.

13. The method according to claim 8, wherein the given resource comprises an icon.

14. The method according to claim 1, wherein recording the one or more transitions comprises recording an event that occurred in response to a user input.

15. The method according to claim 1, wherein the web pages comprise web page elements, and wherein receiving the user selections and the modifications comprises receiving a modification to a given web page element, and updating the state machine model in response to the modification to the given web page element.

16. The method according to claim 15, wherein the given web page element comprises text.

17. The method according to claim 15, wherein the given web page element comprises an image.

18. The method according to claim 15, wherein the given web page element comprises a chart.

19. The method according to claim 1, wherein playing back the demonstration comprises invoking the transitions in the state machine model in response to user inputs while running the demonstration.

20. The method according to claim 1, wherein receiving the user selections comprises presenting, to a user, icons corresponding to the nodes in the state machine model and receiving the user selections of one or more of the icons.

21. An apparatus, comprising:
a memory configured to store a web browser; and
one or more processors configured:
to execute the web browser,
to run by the web browser, a web-based application comprising a set of web pages,
to compile a state machine model of the web-based application, the state machine model comprising a directed graph comprising nodes corresponding to respective states of the web pages and edges corresponding to transitions between the states,
wherein the state machine model is compiled while running the web-based application by:
identifying changes in the web pages rendered by the web browser, and
for each identified change, recording a corresponding state of the web-based application, as one of the nodes in the directed graph and recording one or more transitions from the corresponding state to one or more other states as the edges in the directed graph,
and
to generate a demonstration of the application by receiving user selections of one or more of the nodes in the state machine model and modifications of the respective states of the corresponding nodes, and updating the state machine model based on the modifications,
wherein the demonstration is played back using the updated state machine model.

22. A computer software product for controlling operation of a computer, comprising a non-transitory computer-readable medium, in which program instructions are stored, which instructions, when read by a computer, cause the computer:
to run by a web browser, a web-based application comprising a set of web pages;
to compile a state machine model of the web-based application, the state machine model comprising a directed graph comprising nodes corresponding to respective states of the web pages and edges corresponding to transitions between the states,
wherein the state machine model is compiled while running the web-based application by:
identifying changes in the web pages rendered by the web browser; and
for each identified change, recording a corresponding state of the web-based application, as one of the nodes in the directed graph and recording one or more transitions from the corresponding state to one or more other states as the edges in the directed graph;
and
to generate a demonstration of the application by receiving user selections of one or more of the nodes in the state machine model and modifications of the respective states of the corresponding nodes, and updating the state machine model based on the modifications,
wherein the demonstration is played back using the updated state machine model.

* * * * *